United States Patent [19]

Kaufhold et al.

[11] Patent Number: 5,516,827
[45] Date of Patent: May 14, 1996

[54] STABILIZED, CHLORINE-CONTAINING POLYMER COMPOSITIONS

[75] Inventors: Johannes Kaufhold, Lindenfels; Horst Zinke, Reichelsheim/Odw., both of Germany

[73] Assignee: Ciba-Geigy Corporation, Tarrytown, N.Y.

[21] Appl. No.: 377,297

[22] Filed: Jan. 24, 1995

Related U.S. Application Data

[63] Continuation of Ser. No. 292,655, Aug. 18, 1994, abandoned, which is a continuation of Ser. No. 71,805, Jun. 2, 1993, abandoned.

[30] Foreign Application Priority Data

Jun. 4, 1992 [CH] Switzerland .................. 1806/92

[51] Int. Cl.$^6$ ................... C08K 5/09; C08K 5/51; C08K 5/48
[52] U.S. Cl. .................. 524/397; 524/136; 524/137; 524/146; 524/178; 524/282; 524/398
[58] Field of Search ................. 524/136, 137, 524/146, 178, 282, 397, 399

[56] References Cited

U.S. PATENT DOCUMENTS

| | | | |
|---|---|---|---|
| 3,063,963 | 11/1962 | Wooten, Jr. et al. | 524/178 |
| 3,644,246 | 2/1972 | Lozanou | 524/178 |
| 3,650,984 | 3/1972 | Jones | 524/178 |
| 3,919,165 | 11/1975 | Hechenbleickner | 252/406 |
| 4,197,209 | 4/1980 | Zinke et al. | 252/466 |
| 4,274,999 | 6/1981 | Burley et al. | 524/399 |
| 4,357,434 | 11/1982 | Miyoshi et al. | 524/178 |
| 4,360,619 | 11/1982 | Kugele et al. | 524/178 |
| 4,639,482 | 1/1987 | Muller et al. | 524/137 |
| 4,806,582 | 2/1989 | Boutillier et al. | 524/399 |
| 4,814,369 | 3/1989 | Baker | 524/399 |
| 4,822,833 | 4/1989 | Zappia et al. | 524/99 |
| 4,912,159 | 3/1990 | Hildebrand et al. | 524/289 |
| 4,925,883 | 5/1990 | Baker | 524/399 |
| 5,194,470 | 3/1993 | Carette et al. | 524/399 |

FOREIGN PATENT DOCUMENTS 0337084 10/1989 European Pat. Off. .

Primary Examiner—Kriellion S. Morgan
Attorney, Agent, or Firm—Michele A. Kovaleski; Luther A. R. Hall

[57] ABSTRACT

Compositions comprising a chlorine-containing polymer and a stabilizer mixture comprising:

a) at least one tin alcoholate or tin carboxylate of the formula $[(R_2)_2Sn(OR')]_2O$ (Ia);
$[(R_2)Sn(OR')_2]_2O$ (Ib);
$(R_2)Sn(OR')O$ (Ic);
$[-(R_2)Sn(OR')O-]_m$ (Id);
$[-(R_1CO_2Sn(R_2)_2]_2O$ (IIa);
or
$[-(R_2)_2Sn-O_2C-R_3-CO_2-\{(R_2)_2SnO\{(R_2)_2SnO\}_i-]_n$ (IIb);

b) at least one organic zinc carboxylate, zinc phenoxide or a tin chloride of the formula $[(R_1CO_2)_x(R_2)_yCL_zSn]_nO_{n-1}$ (III)

and c) at least one thiophosphate or thiophosphite of the formula $(R_6S)_3P=X_b$ (IV)

where the individual radicals are as defined in claim 1.

9 Claims, No Drawings

STABILIZED, CHLORINE-CONTAINING POLYMER COMPOSITIONS

This application is a continuation of application Ser. No. 08/292,655, filed Aug. 18, 1994 now abandoned which is a continuation of of Ser. No. 08/071,805 filed Jun. 2, 1993 now abandoned.

The invention relates to novel chlorine-containing polymer compositions, and to the use of the polymer compositions. U.S. Pat. No. 3,919,165 discloses a stabiliser mixture for halogen-containing polymers which contains an organic thiophosphorus compound. Other thiophosphorus compounds for stabilising halogen-containing polymers are also disclosed in U.S. Pat. Nos. 4,197,209 and 4,639,482.

The known stabilisers and stabiliser mixtures are unable to satisfy all the demands made of them in the polymers.

It has now been found that chlorine-containing polymer compositions stabilised in accordance with the present invention have further improved properties with respect to thermal and light stability.

This is achieved according to the invention by means of a composition, with or without plasticisers, comprising a chlorine-containing polymer and a stabiliser mixture comprising:

a) at least one tin alcoholam or tin carboxylate of the formula

 $[(R_2)_2Sn(OR')]_2O$ (Ia);

 $[(R_2)Sn(OR')_2]_2O$ (Ib);

 $(R_2)Sn(OR')O$ (Ic);

 $[-(R_2)Sn(OR')O-]_m$ (Id);

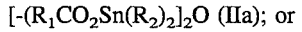 $[-(R_1CO_2Sn(R_2)_2]_2O$ (IIa); or

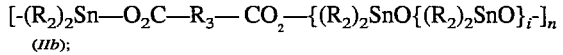 $[-(R_2)_2Sn-O_2C-R_3-CO_2-\{(R_2)_2SnO\{(R_2)_2SnO\}_i-]_n$ (IIb);

where R' is $C_3$–$C_{24}$alkyl, phenyl, $C_1$–$C_{12}$alkyl-substituted phenyl or phenyl-$C_1$–$C_{12}$alkyl; $R_1$ is $C_3$–$C_{24}$alkyl, phenyl, $C_1$–$C_{12}$alkyl-substituted phenyl, $C_5$–$C_{10}$cycloalkyl, phenyl-$C_1$–$C_{12}$alkyl or $R_4$—$O_2C$—CH=CH—;

$R_2$ is $C_1$–$C_{24}$alkyl or $C_4$–$C_{18}$alkanoyloxyethyl;

$R_3$ is phenylene, $C_1$–$C_{12}$alkyl-substituted phenylene, $C_1$–$C_{18}$alkylene or —CH=CH—

$R_4$ is $C_1$–$C_{24}$alkyl, $C_5$–$C_{10}$cycloalkyl, phenyl or $C_1$–$C_{12}$alkyl-substituted phenyl;

i is a number greater than or equal to zero;

m is the number 2 or 3, and n is a number greater than or equal to one;

b) at least one organic zinc carboxylate, zinc phenoxide or a tin chloride of the formula

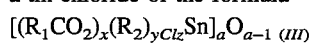 $[(R_1CO_2)_x(R_2)_yCl_zSn]_aO_{a-1}$ (III)

where $R_1$ and $R_2$ are as defined under formula (IIa);

x and y, independently of one another, are 0, 1 or 2;

a is the number 1 or 2;

z is the number 1, 2, 3 or 4, with the proviso that x+y+z+a is five;

and c) at least one thiophosphate or thiophosphite of the formula

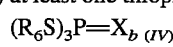 $(R_6S)_3P=X_b$ (IV)

where $R_6$ is $C_3$–$C_{18}$alkyl, phenyl, $C_1$–$C_{12}$alkyl- or $R_5CO_2$-substituted phenyl, $C_4$–$C_{21}$alkanoyloxyalkylene, $C_1$–$C_{18}$ alkoxycarbonyl-$C_1$–$C_{12}$alkylene, which may be interrupted by oxygen, sulfur or —$NR_5$—, phenyl-$C_1$–$C_2$alkylenoxycarbonyl-$C_1$–$C_{12}$alkylene, which may be interrupted by oxygen, sulfur or —$NR_5$—, $C_1$–$C_{12}$alkyl-substituted phenyl-$C_1$–$C_{12}$ alkylenoxycarbonyl—$C_1$–$C_{12}$alkylene, which may be interrupted by oxygen, sulfur or —$NR_5$—, or $C_5$–$C_{15}$cycloalkyl-$C_0$–$C_6$alkyleneoxycarbonyl-$C_1$–$C_{12}$ alkylene, which may be interrupted by oxygen, sulfur or —$NR_5$—;

$R_5$ is hydrogen or $C_1$–$C_6$alkyl;

X is oxygen or sulfur, and b is the number zero or 1.

Above enumerated compounds a), b) and c) may also be in the form of mixtures of the cited single compounds. Comproportionation products of possible mixtures of the compounds of the formulae (Ia), (Ib) and (Id) are also included in a).

R', $R_1$, $R_2$, $R_4$, $R_5$ or $R_6$ as, for example, an alkyl group having up to 24 carbon atoms is, for example, methyl, ethyl, propyl, isopropyl, n-butyl, i-butyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, 2-ethylbutyl, 1-methylpentyl, 1,3-dimethylbutyl, 1,1,3,3-tetramethylbutyl, 1-methylhexyl, isoheptyl, 1-methylheptyl, 1,1,3-trimethylhexyl, 1,1,3,3-tetramethylhexyl, 1-methylundecyl, 3,5,5-trimethylhexyl, eicosyl, heneicosyl and docosyl.

$C_1$–$C_{12}$alkyl-substituted phenyl R', $R_1$, $R_4$ or $R_6$ is, for example, methylphenyl, ethylphenyl, propylphenyl, n-butylphenyl, tert-butylphenyl, octylphenyl, dimethylphenyl, methyl-tert-butylphenyl or di-tert-butylphenyl.

The meanings of alkylene groups and phenylene groups are derived from those of the alkyl and phenyl groups mentioned.

$C_5$–$C_{10}$cycloalkyl $R_1$ or $R_4$ may be, for example, cyclopentyl, cyclohexyl, cyclooctyl or cyclodecyl.

Phenyl-$C_1$–$C_2$alkyl R' or $R_1$ is, for example, benzyl or methylbenzyl.

$C_4$–$C_8$alkanoyloxyethyl or $C_4$–$C_{21}$alkanoyloxyalkyl $R_2$ and $R_6$ are, for example, acetoxyethyl, propionyloxyethyl, butyryloxyethyl, octanoyloxyethyl, acetoxypropyl, propionyloxypropyl, butyryloxypropyl or octanoyloxypropyl.

$R_6$ as $C_1$–$C_{18}$alkoxycarbonyl-$C_1$–$C_{12}$alkylene which may be interrupted by oxygen, sulfur or —$NR_5$— is, for example, $C_4H_9OC(O)C_2H_4$- or $C_4H_9OC(O)C_4H_8$-.

$R_6$ as phenyl-$C_1$–$C_{12}$alkyleneoxycarbonyl-$C_1$–$C_{12}$ alkylene which may be interrupted by oxygen, sulfur or —$NR_5$— is, for example, $C_6H_5CH_2OC(O)C_2H_4$— or $C_6H_5CH_2OC(O)C_4H_8$—.

$R_6$ as $C_1$–$C_{12}$alkyl-substituted phenyl-$C_1$–$C_{12}$alkyleneoxycaxbonyl-$C_1$–$C_{12}$alkylene which may be interrupted by oxygen, sulfur or —$NR_5$, is, for example, $C_6H_4(CH_3)CH_2OC(O)C_2H_4$- or $C_6H_4(CH_3)CH_2OC(O)C_4H_8$-.

$R_6$ as $C_5$–$C_{15}$cycloalkyl-$C_0$–$C_6$alkyleneoxycarbonyl-$C_1$–$C_{12}$allcylene which may be interrupted by oxygen, sulfur or —$NR_5$— is, for example, $C_6H_{11}CH_2OC(O)C_2H_4$- or $C_6H_{11}CH_2OC(O)C_4H_8$-.

The polymer compositions according to the invention may contain further components, for example antioxidants, light stabilisers, UV absorbers, polyols, epoxides, epoxidised oils and further complexing agents for Lewis acids.

Expedient compositions are those as described above in which a) is a compound of the formula (IIa) in which $R_1$ is $C_6$–$C_{18}$allcyl and $R_2$ is $C_4$–$C_8$alkyl, or of the formula (IIb) in which $R_3$ is phenylene or —CH=CH—. In the compounds of the formula (IIb), i is preferably a number between 0 and 2 and n a number between 1 and 4.

Expedient polymer compositions are those as described above in which b) is at least one organic zinc compound from the series consisting of aliphatic, saturated $C_2$–$C_{22}$carboxylates, aliphatic, olefinic $C_3$–$C_{22}$carboxylates, aliphatic $C_2$–$C_{22}$carboxylates which are substituted by at least one OH group, cyclic and bicyclic carboxylates having 5–22 carbon atoms, aromatic $C_7$–$C_{22}$carboxylates, aromatic $C_7$–$C_{22}$carboxylates which are substituted by at least one OH group, $C_1$–$C_{16}$alkyl-substituted phenyl carboxylates, phenyl-$C_1$–$C_{16}$alkyl carboxylates and $C_6$–$C_{18}$phenoxides.

Examples which may be mentioned by name are the zinc salts of monovalent carboxylic acids, such as acetic acid, propionic acid, butyric acid, valetic acid, hexanoic acid, enanthic acid, octanoic acid, neodecanoic acid, 2-ethylhexanoic acid, pelargonic acid, decanoic acid, undecanoic acid, dodecanoic acid, tridecanoic acid, myrisfic acid, palmitic acid, isostearic acid, stearic acid, 12-hydroxystearic acid, behenic acid, benzoic acid, p-tert-butylbenzoic acid, dimethylhydroxybenzoic acid, 3,5-di-tert-butyl-4-hydroxybenzoic acid, tolic acid, dimethylbenzoic acid, ethylbenzoic acid, cumic acid, n-propylbenzoic acid, salicylic acid, p-tertoctylsalicylic acid and sorbic acid; zinc salts of monoesters of divalent carboxylic acids, such as oxalic acid, malonic acid, succinic acid, glutamic acid, adipic acid, pentane-1,5-dicarboxylic acid, hexane-1,6-dicarboxylic acid, heptane-1,7-dicarboxylic acid, octane-1,8-dicarboxylic acid, phthalic acid, isophthalic acid, terephthalic acid and hydroxyphthalic acid; and diesters or triesters of trivalent or tetravalent carboxylic acids, such as hemimellitic acid, trimellitic acid, mellophanic acid and pyromellitic acid.

Preference is given to compositions as described above in which b) is an organic zinc carboxylate of a carboxylic acid having 7 to 18 carbon atoms, for example benzoates or alkanoates, preferably stearates, oleates, laurates, palmitates, hydroxystearates or 2-ethylhexanoates, or a compound of the formula (IV) in which $R_1$ is $C_6$–$C_{18}$alkyl, $R_2$ is $C_4$–$C_8$alkyl and a is the number 1. Particular preference is given to stearates, oleates and p-tert-butylbenzoates.

Expedient compositions are those as described above in which c) is at least one compound of the formula (IV) in which $R_6$ is $C_3$–$C_{18}$alkyl, $R_5CO_2$-substituted phenyl, oxygen-interrupted $C_1$–$C_{18}$alkoxycarbonyl-$C_1$–$C_{12}$alkylene, phenyl-$C_1$–$C_{12}$alkylenoxycarbonyl-$C_1$–$C_{12}$alkylene or $C_5$–$C_{15}$cycloalkyl-$C_0$–$C_6$ alkyleneoxycarbonyl-$C_1$–$C_{12}$alkylene; and $R_5$ is hydrogen or $C_1$–$C_6$alkyl; and in particular $R_6$ is $C_6$–$C_{12}$alkyl or $C_3$–$C_{18}$alkyloxycarbonyl-$C_1$–$C_5$alkylene.

Examples of compounds of the formula (IV) are:

TABLE A

| | | [R'—O—C(O)—CH($CH_3$)—S]$_3$P = X | (R"S)$_3$P = X | |
|---|---|---|---|---|
| | Type: | (A) | (B) | |
| Ex. | Type | R' | X | $n_D^{20}$ |
| 100 | A |  | O | 1.5457* |
| 101 | " | " | — | 1.5493 |
| 102 | " | $C_4H_9CH(C_2H_5)$—$CH_2$— | S | 1.5096 |
| 103 | " | " | O | 1.4937 |
| 104 | " | n-$C_{12}H_{25}$— | O | 1.4879 |
| 105 | " | $C_4H_9$—O—$CH_2$—$CH_2$— | O | 1.4936 |
| 106 | " | 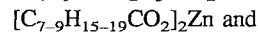 | O | 1.5804 |

TABLE A-continued

| | | [R'—O—C(O)—CH($CH_3$)—S]$_3$P = X | (R"S)$_3$P = X | |
|---|---|---|---|---|
| | Type: | (A) | (B) | |
| Ex. | Type | R' | X | $n_D^{20}$ |
| 107 | B | 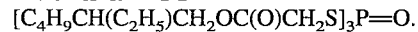 | — | m.p. 54–56° C. |
| 108 | " | " | O | 1.5922* |

*$n_D^{30}$

Preference is given to compositions as described above comprising:

$[C_4H_9CH(C_2H_5)CO_2$—Sn—$(C_4H_9)_2O$,
$[C_{7-9}H_{15-19}CO_2]_2Zn$ and
$[C_4H_9CH(C_2H_5)CH_2OC(O)CH_2S]_3P{=}O$.

Components a), b) and c) of the composition are known per se and can be prepared by known methods. Thus, for example, the organolin compounds are described in Houben-Weyl, "Methoden der Organisthen Chemic" [Methods of Organic Chemistry], Georg Thieme Verlag, Stuttgart 1978, Vol. 13/6, pp. 294ff., A. K. Sawyer, "Organotin Compounds", Marcel Dekker Inc., New York 1971, Vol. I, Chapters. II and III and Vol. II, p. 264, and W. P. Neumann, "Die Organische Chemic des Zinns" [The Organic Chemistry of Tin], Ferdinand Enke Verlag, Stuttgart 1967, p. 131. A more detailed description of the phosphorus compounds is given, for example, in Houben-Weyl, "Methoden der Organisthen Chemie" [Methods of Organic Chemistry], Georg Thieme Verlag, Stuttgart 1964, Vol. 12/2, pp. 93ff and 742ff, and in German Patent 2 809 492.

The chlorine-containing polymers can be those listed below: polymers of vinyl chloride, vinyl resins containing vinyl chloride units in their structure, such as copolymers of vinyl chloride and vinyl esters of aliphatic acids, in particular vinyl acetate, copolymers of vinyl chloride with esters of acrylic and methacrylic acid and with acrylonitrile, copolymers of vinyl chloride with diene compounds and unsaturated dicarboxylic acids or anhydrides thereof, such as copolymers of vinyl chloride with diethyl maleate, diethyl fumarate or maleic arthydride, post-chlorinated polymers and copolymers of vinyl chloride, copolymers of vinyl chloride and vinylirene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerisable compounds; polymers of vinyl chloroacetate and dichlorodivinyl ether; chlorinated polymers of vinyl acetate, chlorinated polymeric esters of acrylic acid and alpha-substituted acrylic acid; polymers of chlorinated styrenes, for example dichlorostyrene; chlorinated rubbers; chlorinated polymers of ethylene; polymers and post-chlorinated polymers of chlorobutadiene and copolymers thereof with vinyl chloride, rubber hydrochloride and chlorinated rubber hydrochloride; and mixtures of said polymers with one another or with other polymerisable compounds.

Also suitable are graft polymers of PVC with EVA, ABS and MBS. Preferred substrates are also mixtures of the above-mentioned homopolymers and copolymers, in particular vinyl chloride homopolymers, with other thermoplastic and/ or elastomeric polymers, in particular blends with ABS, MBS, NBR, SAN, EVA, CPE, MBAS, PMA, PMMA, EPDM and polylactones.

Also preferred are suspension, bulk and emulsion polymers. The particularly preferred chlorine-containing polymer is polyvinyl chloride, in particular suspension or bulk polyvinyl chloride.

Expedient polymer compositions are those as described above which comprise, based on 100 parts by weight of the composition,
a) from 0.1 to 2.5 parts by weight of a compound of the formula (Ia), (Ib), (Ic), (Id), (IIa) or (IIb),
b) from 0.01 to 2 parts by weight of a zinc carboxylate, zinc phenoxide or a compound of the formula (III) and
c) from 0.1 to 3 parts by weight of a compound of the formula (IV).

The amounts of the compounds of the formula (Ia), (Ib), (Ic), CId), (IIa) or (IIb) in the polymer composition are in the range from 0.5 to 1.5 parts by weight, particularly preferably from 0.6 to 1.0 part by weight, based on 100 parts by weight of composition.

The amounts of the zinc carboxylates, zinc phenoxides or the compounds of the formula (III) in the composition are preferably in the range from 0.05 to 1 part by weight, based on 100 parts by weight of composition.

The amounts of the compounds of the formula (IV) in the composition are preferably in the range from 0.3 to 2 parts by weight, particularly preferably from 0.4 to 1 part by weight, based on 100 parts by weight of composition.

The chlorine-containing polymer may contain a plasticiser, preference being given to chlorine-containing polymers containing no plasticiser.

Examples of suitable organic plasticisers are those from the following groups:

A) Phthalates (esters of phthalic acid)

Examples of these plasticisers are dimethyl, diethyl, dibutyl, dihexyl, di-2-ethylhexyl, di-n-octyl, di-isooctyl, di-isononyl, di-isodecyl, di-isotridecyl, dicyclohexyl, dimethylcyclohexyl, dimethyl glycol, dibutyl glycol, benzyl butyl and diphenyl phthalates, and mixtures of phthalates, such as $C_7$–$C_9$- and $C_9$–$C_{11}$alkyl phthalates made from predominantly linear alcohols, $C_6$–$C_{10}$-n-alkyl phthalates and $C_5$–$C_{10}$-n-alkyl phthalates. Preference is given to dibutyl, dihexyl, di-2-ethylhexyl, di-n-octyl, di-isooctyl, di-isononyl, di-isodecyl, di-isotridecyl and benzyl butyl phthalates, and said mixtures of alkyl phthalates. Particular preference is given to di-2-ethylhexyl phthalate (DOP).

B) Esters of aliphatic dicarboxylic acids, in particular esters of adipic, azelaic and sebacic acids Examples of these plasticisers are di-2-ethylhexyl adipate, di-isooctyl adipate (mixture), di-isononyl adipate (mixture), di-isodecyl adipate (mixture), benzyl butyl adipate, benzyl octyl adipate, di-2-ethylhexyl azelate, di-2-ethylhexyl sebacate and di-isodecyl sebaeate (mixture). Preference is given to di-2-ethylhexyl adipate and di-isooctyl adipate.

C) Esters of trimellitic acid, for example tri-2-ethylhexyl trimellitate, tri-isodecyl trimellitate (mixture), tri-isotridecyl trimellimte, tri-isooctyl trimellitate (mixture) and tri-$C_6$–$C_8$alkyl, tri-Ce-Cmalkyl, tri-$C_7$–$C_9$alkyl and tri-$C_9$–$C_{11}$alkyl trimellitates. The last-mentioned trimellitates are formed by esterifying trimellitic acid by means of the appropriate alkanol mixtures. Preferred trimellitates are tri-2-ethylhexyl trimellitate and said trimellitates made from alkanol mixtures.

D) Polymer plasticisers

A definition of these plasticisers and examples thereof are given in "Plastics Additives Handbook", Editors H. Gachter and H. Müller, Hanser Publishers, 1985, page 284, chapter 5.7.10, and in "PVC Technology", Editor W. V. Titow, 4th Ed., Elsevier Publ., 1984, pages 165–170. The most usual starting materials for the preparation of polyester plasticisers are dicarboxylic acids, such as adipic, phthalic, azelaic and sebacic acids; cliols, such as 1,2-propanediol, 1,3-butanediol, 1,4-butanediol, 1,6-hexanediol, neopentyl glycol and diethylene glycol; monocarboxylic acids, such as acetic, caproic, caprylic, lauric, myristic, palmitic, stearic, pelargonic and benzoic acids; monofunctional alcohols, such as isooctanol, 2-cthylhexanol, isodccanol and $C_7$–$C_9$alkanol and $C_9$–$C_{11}$alkanol mixtures. Particularly advantageous arc polyester plasticisers made from said dicarboxylic acids and monofunctional alcohols.

E) Esters of phosphoric acid

A definition of these esters is given in the abovementioned "Plastics Additives Handbook" on page 271, chapter 5.7.2. Examples of these phosphates are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate.

F) Chlorinated hydrocarbons (paraffins)

G) Hydrocarbons

H) Monoesters, for example butyl oleate, phenoxyethyl oleate, tetrahydrofuffuryl oleate and esters of alkylsulfonic acids.

I) Glycol esters, for example diglycol benzoates.

Definitions and examples of plasticisers from groups F) to I) are given in the following handbooks:

"Plastics Additives Handbook", Editors H. Glichter and H. Müller, Hanser Publishers, 1985, page 284, chapter 5.7.11 (Group F)) and chapter 5.7.13 (Group G)).

"PVC Technology", Editor W.V. Titow, 4th Ed., Elsevier Publishers, 1984, pages 171–173, chapter 6.10.2 (Group F)), page 174, chapter 6.10.5 (group G)), page 173, chapter 6.10.3 (group H)) and pages 173–174, chapter 6.10.4 (group I)).

Particular preference is given to plasticisers from group A) to E), in particular A) to C), especially the plasticisers in these groups which have been mentioned as preferred. Di-2-ethylhexyl phthalate (DOP) is particularly favourable. The plasticisers can be used in an amount of, for example, from 15 to 70 parts by weight, expediently from 15 to 60 parts by weight, in particular from 20 to 50 parts by weight, based on 100 parts by weight of polymer composition.

The compositions according to the invention may also contain further stabilisers which are conventional for chlorine-containing thermoplasfics. Thus, they contain, for example, 0–3 parts, in particular 0–1.5 parts, especially 0–1 part, based on the composition, of one or more phosphites. Such phosphites can be used, for example, in an amount of 0.01–3 parts, in particular 0.01–1.5 parts, for example 0.01–1 part, preferably 0.1–0.6 part, for example 0.2–0.5 part. Examples of such phosphites are, for example, those of the formulae

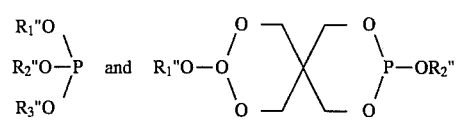

in which $R^{1"}$, $R^{2"}$ and $R^{3"}$ are identical or different and are $C_6$–$C_{18}$alkyl, $C_6$–$C_{18}$alkenyl, substituted or unsubsdtuted phenyl or $C_5$–$C_7$cycloalkyl.

$C_6$–$C_{18}$alkyl $R^{1"}$, $R^{2"}$ and $R^{3"}$ are, for example, n-hexyl, n-octyl, n-nonyl, decyl, dodecyl, tetradecyl, hexadecyl or octadecyl. Preference is given to alkyl groups having 8 to 18 carbon atoms.

Substituted phenyl $R^{1''}$, $R^{2''}$ and $R^{3''}$ are, for example, tolyl, ethylphenyl, xylyl, cumyl, cymyl, cresyl, 4-methoxyphenyl, 2,4-dimethoxyphenyl, ethoxyphenyl, butoxyphenyl, p-octylphenyl, p-nonylphenyl or p-dodecylphenyl.

Particularly suitable phosphites are trioctyl, tridecyl, tridodecyl, tritetradecyl, tristearyl, trioleyl, triphenyl, tricresyl, tris-p-nonylphenyl and tricyclohexyl phosphites, and particular preference is given to aryl dialkyl phosphites and alkyl diaryl phosphites, for example phenyl didecyl, decyl diphenyl, 2,4-di-tert-butylphenyl didodecyl and 2,6-di-tert-butylphenyl didodecyl phosphites, bis[2,4-di-tert-butyl-6-methylphenyl alkyl phosphites and dialkyl and diaryl pentaerythrityl diphosphites, such as distearyl pentaerythrityl diphosphite.

Preferred organic phosphites are distearyl pentaerythrityl diphosphite, trisnonylphenyl phosphite and phenyl didecyl phosphite.

The compositions according to the invention may furthermore contain further known costabilisers, for example 0–2 parts, in particular 0–1.5 parts, based on the composition. They are then preferably present in an amount of 0.01–2 parts, in particular 0.05–1.5 parts, for example 0.1–1 part, especially 0.1–0.5 part. Examples of these costabilisers which may be mentioned are dehydracetic acid, 2,4-dihydroxybenzophenone, 2,4-dihydroxy-4'-tert-butylbenzophenone, dihydropyridine derivatives and pyrrole derivatives. Pyrrole costabilisers which may be mentioned in particular are those described in EP-A 22 087 and GB-A 2 078 761, for example of the formula I given therein, preferably the pyrrole derivatives defined in claims 2–9 of EP-A 22 087. An example which may be mentioned is 2-methyl-3-cyclohexyloxycarbonyl-4-phenyl-1H-pyrrole.

The compositions according to the invention may furthermore contain, in addition to or instead of, the abovementioned optional costabilisers, further optional constituents, for example organoantimony compounds, such as antimony tris[isooctyl thioglycolate] (isooctyl=2-ethylhexyl).

Other stabilisers which may be used in the compositions according to the invention are polyols. The amounts to be used are, for example, up to 3 parts by weight, expediently up to 2 parts by weight and preferably from 0.01 to 1 part by weight, based on 100 parts by weight of composition. Typical examples of polyols are pentaerythritol, dipentaerythritol, trimethylolpropane, ditrimethylolpropane, tris(2-hydroxyethyl) isocyanurate (THEIC), the latter being preferred, sorbitol, mannitol and inositol.

The compositions according to the invention may furthermore contain conventional antioxidants, light stabilisers and IN absorbers. Examples of these are the following:

1. Antioxidants 1.1 Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Hydroxylated diphenyl thioethers, for example 2,2'-thiobis(6-tert-butyl-4-methylphenol), 2,2'-thiobis(4-octylphenol), 4,4'-thhiobis(6-tert-butyl-3-methylphenol), 4,4'-thio-bis(6-tert-butyl-2-methylphenol), 4,4'-thiobis(3,6-di-sec-amylphenol), 4,4'-bis(2,6-dimethyl-4-hydroxyphenyl) disulfide.

1.5. Alkylidenebisohenols, for example 2,2'-methylene-bis(6-tert-butyl-4-methylphenol), 2,2'-methylene-bis(6-tert-butyl-4-ethylphenol), 2,2'-methylene-bis[4-methyl-6-($\alpha$-methyleyclohexyl)-phenol], 2,2'-methylene-bis(4-methyl-6-cyclohexylphenol), 2,2'-methylene-bis(6-nonyb4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-($\alpha$-methylbenzyl)-4-nonylphenol], 2,2'-methylene-bis[6-($\alpha,\alpha$-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)-butane, 1,1-bis(5-tert-butyl-4-hydroxy-2-methyl-phenyl)-3-n-dodecylmercaptobutane, ethylene glycol bis[3,3-bis-(3'-tert-butyl-4'-hydroxyphenyl)butyrate], bis(3-tert.butyl-4-hydroxy-5-methyl-phenyl)-dicyclopentadiene, bis[2-(3'-tert-butyl-2'-hydroxy-5'-methyl-benzyl)-6-tert-butyl-4-methyl-phenyl] terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmer captobutane, 1,1,5,5-tetra(5-tert-butyl-4-hydroxy-2-methylphenyl)pentane.

1.6. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis-(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate.

1.7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl)phenyl]2,2-bis-(3,5-di-tert-butyl-4-hydroxybenzyl)-malonate.

1.8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl )phenol.

1.9. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-lriazine, 2,4,6tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl)

isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahyd ro-1,3,5-triazine, 1,3,5-tris(3,5-dicyclohexyl-4-hydroxybenzyl) isocyanurate.

1.10. Benzylphosphonates, for example dimethyl 2,5-di-tert-butyl-4 -hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of monoethyl 3,5-di-tert-butyl-4-hydroxybenzyl phosphonate.

1.11. Acylaminophenols, for example 4-hydroxylauranilide, 4-hydroxystearanilide, octyl N-(3,5-di-tert-butyl-4-hydroxyphenyl)carbamate.

1.12. Esters of 6-(3,5-di-tert.butyl-4-hydroxyphenyl)propionic acid with monohydric or polyhydric alcohols, for example with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.13. Esters of β-(5-tert-butyl-4-hydroxy-3-methvlphenyl-)propionie acid with monohydric or polyhydric alcohols, for example with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.14. Esters of β-(3,5-dicyclohexyl-4-hydroxyphenyl)propionic acid with monohydric or polyhydric alcohols, for example with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.15. Esters of 13-(3,5.-di-tert-butyl-4-hydroxyphenylacetic acid with monohydric or polyhydric alcohols, for example with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tri(hydroxyethyl) isocyanurate, N,N'-bis(hydroxyethyl)oxalamide, 3-thiaundecanol, 3-thiapentadecanol, trimethylhexanecliol, trimethylolpropane, 4-hydroxymethyl-1-phospha-2,6,7-trioxabicyclo-[2.2.2]-octane.

1.16. Amides of β-(3,5-di-tert-butyl-4-hydroxyphenyl)propionie acid, for example N,N'-bis(3,5-di-tert-butyl-4-hydroxyphenylpropionyl)hexamethylendiamine, N,N'-bis(3,5-di-tert-butyl-4-hydroxyphenylpropionyl)-trimethylendiamine, N,N'-bis(3,5-di-tert-butyl-4-hydroxyphenylpropionyl)-hydrazine.

2. UV Absorbers and light stabilisers 2.1.2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5' -(1,1,3,3-tetramethylbutyl)phenyl)benzotriazole, 2-(3',5' -di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, mixture of 2-(3'-tert-butyl-2'-hydroxy-5' -(2-octyloxycarbonylethyl)phenyl)-5-chlorobenzotriazole, 2-(3'-tert-butyl-5' -[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hyctroxyphenyl)benzotriazole, 2-(3'-dodecyl-2'-hydroxy-5'-methylphenyl)benzotriazole, and 2-(3'-tert-butyl-2' -hydroxy-5'-(2-isooctyloxycarbonylethyl)phenylbenzotriazole, 2,2'-methylenehis[4-(1,1,3,3 -tetramethylbutyl)-6-benzotriazol-2-yl phenol]; transestefification product of 2-[3' -tert-butyl-5'-(2-methoxycarbonylethyl)-2'-hydroxyphenyl]benzotriazole with polyethylene glycol 300; [R-CH$_2$CH$_2$—COO(CH$_2$)$_3$—]$_2$- where R=3'-tert-butyl-4'-hydroxy-5'-2H-benzotriazol-2-yl phenyl.

2.2.2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl and isooctyl α-cyano-β,β-diphenylacrylate, methyl α-carbomethoxycinnamate, methyl and butyl a-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4–1auroyl-5-hydroxypyrazole, if desired with additional ligands.

2.6. Sterically hindered amines, for example bis(2,2,6,6-tetramethylpiperidyl) sebacate, bis(2,2,6,6-tetramethylpiperidyl) succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the product of the condensation of 1-hydroxyethyl-2,2,6,6-tetramethyl-4-hydroxypiperidine and succinic acid, the products of the condensation of N,N'-bis(2,2,6,6-tetramethyl-4-piperidyl)hexamethylenediamine and 4-tert-octylamino-2,6-dichloro-1,3,5-s-triazine, tris(2,2,6,6- tetramethyl-4-piperidyl) nitrilotriacetate, tetrakis(2,2,6,6-tetramethyl-4-piperidyl) 1,2,3,4-butanetetraoate, 1,1'-(1,2- ethanediyl)bis-(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the product of the condensation of N,N'-bis(2,2,6,6-tetramethyl-4-piperidyl)hexamethylcne diamine and 4-morpholino-2,6-dichloro-1,3,5-triazine, the product of the condensation of 2-chloro-4,6-di(4-n-butylamino-2,2,6,6-tetramethylpiperidyl)-1,3,5-triazine and 1,2-bis(3-aminopropylamino)ethane, the product of the condensation of 2-chloro-4,6-di(4-n-butylamino1,2,2,6,6-pentamethylpiperidyl)-1,3,5-triazine and 1,2-bis(3-aminopropylamino)ethane, 8-acetyl-3-dodccyl-7,7,9,9-tewamethyl-1,3,8-triazaspiro[4.5]dccane-2,4-dione, 3-dodecyl-1-(2,2,6,6-tgtmmethyl-4-piperidyl)pyrrolidine-2,5-dione, 3-dodecyl-1-(1,2,2,6,6-pentamethyl-4-piperidyl)pyrrolidine-2,5-dione.

2.7. Oxalamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstimted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butoxypropoxy)phenyl]-4,6-bis(2,4-dimethylphenyl)-1,3,5-triazine, 2-[2-(hydroxy-4-(2-hydroxy-3-octyloxypropoxy)phenyl]-4,6-bis(2,4-dimethylphenyl)-1,3,5-triazine.

Depending on the application, the compositions according to the invention may also contain further conventional additives, for example 3. Metal deactivators, for example N,N'-diphenyloxalamide, N-salicylyl-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalohydrazide, oxanilide, isophthalodihydrazide, N,N'-diphenylsebacohydrazide, N,N'-diacetyladipohydrazide, N,N'-bissalicyloyloxalohydrazide, N,N'-bissalicyloylthiopropionohydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4-di-tert-butylphenyl) pentaerythrityl diphosphite, bis(2,6-di-tert-butyl-4-methylphenyl) pentaerythrityl diphosphite, bisisodecyloxy pentaerythrityl diphosphite, bis(2,4-di-tert-butyl-6-methylphenyl) pentaerythrityl diphosphite, bis(2,4,6-tri-tert-butylphenyl)pentaerythrityl diphosphite, tristearyl sorbityl triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyldibenz[d,g]-1,3,2-dioxaphosphocine, bis(2,4-di-tert-butyl-6-methylphenyl) methyl phosphite, bis(2,4-di-tert-butyl-6-methylphenyl) ethyl phosphite.

5. Peroxide-destroying compounds, for example esters of β-thiodipropionic acid, for example the lauryl, stearyl, myristyl and tridecyl esters, mercaptobenzimidazole, the zinc salt of 2-mercaptobenzimidazole, zinc dibutyldithiocarbamate, dioctadecyl disulfide and pentaerythrityl tetrakis([3-dodecylmercapto)propionate.

6. Polyamide stabilisers, for example copper salts in combination with iodides and/or phosphorus compounds and salts of divalent manganese.

7. Basic costabilisers, for example melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmirate, antimony pyrrocatecholate and tin pyrrocatecholate.

8. Nucleating agents, for example 4-tert-butylbenzoie acid, adipic acid, diphenylacetic acid.

9. Fillers and reinforcing agents, for example calcium carbonate, silicates, glass fibres, talc, kaolin, mica, barium sulfate, metal oxides and hydroxides, carbon black and graphite.

10. Other additives, for example plasticisers, lubricants, emulsifiers, pigments, optical brighteners, flameproofing agents, antistatics and blowing agents.

11. Benzofuranones and indolinones, as described, for example, in U.S. Pat. Nos. 4,325,863 and 4,338,244.

In addition to said stabilisers and costabilisers of this invention, it is also possible to use epoxy compounds, such as 1,2-epoxides and oxiranes, in amounts of, for example, up to 10 parts by weight, expediently up to 5 parts by weight and preferably from 0.01 to 2 parts by weight, based on 100 parts by weight of the composition. Examples of these compounds are epoxidised polybutadiene, epoxidised soyabean oil, epoxidised linseed oil, epoxidised fish oil; epoxidised tallow, methylbutyl or 2-ethylhexyl epoxystearate, tris(epoxypropyl) isocyanurate, epoxidised castor oil, epoxidised sunflower oil, 3-(2-phenoxy)-1,2-epoxypropane, bisphenol A polyglycidyl ether, vinylcyclohexene diepoxide, dicyclopentadiene diepoxide and 3,4-epoxycyclohexylmethyl 3,4-epoxycyclohexanecarboxylate.

The compositions according to the invention can be prepared in a manner known per se. In general, the stabiliser system is incorporated into the polymer using equipment known per se, such as calenders, mixers, compounders and the like.

The compositions stabilised in accordance with the present invention can be converted into the desired shape in a known manner. Methods of this type are, for example, grinding, calendering, extrusion, injection moulding, sintering and spinning, furthermore extrusion blow moulding or conversion by the plastisol process. The compositions can also be converted into foams.

Preferred stabilised chlorine-containing polymer compositions are unplasticised or plasticiser-free or essentially plasticiser-free compositions.

The compositions according to the invention are particularly suitable, in the form of rigid recipes, for hollow articles (bottles), packaging films (thermoformed films), blown films, crash-pad films (automobiles), tubes, foams, heavy profiles (window frames), light-wall profiles, building profiles, sidings, fittings, office films and equipment housings (computers and domestic appliances).

Other compositions, in the form of flexible recipes, are wire sheaths, cable insulations, decorative films, roof sheeting, foams, agricultural sheeting, tubes, sealing profiles, office films and sheeting for inflated tents and vehicle interiors. Examples of the use of the compositions according to the invention as plastisols are artificial leather, flooring, textile coatings, wallcoverings, coil coatings and automotive underseal.

Examples of sintered PVC applications of the compositions according to the invention are slush, slush mould and coil coatings.

The above-described polymer compositions are preferably used as rigid profiles for external applications and as rigid films.

The examples below illustrate the invention in greater detail. Parts and percentages are by weight, unless stated otherwise.

Example 1: A PVC composition is prepared by mixing individual components as shown in the table below (amounts in parts by weight).

Table 1

100 parts by weight of S-PVC, K value 60

0.2 part by weight of montanic acid esters 1 part by weight of glycerol monooleate 1.1 parts by weight of bis(dibutyl-i-heptylcarboxytin) oxide 0.2 part by weight of zinc 2-ethylhexanoate 0.5 part by weight of tris(2-ethylhexyloxycarbonylmethylthio) phosphate This is a recipe for rigid PVC profries for external applications. The composition is subjected to a long-term roll test in order to test the stabiliser action in PVC.

The long-term roll test is carried out by plasticating the PVC composition at 190° C. for 5 minutes on mixing rolls and subsequently cutting samples out of the centre of the film (0.3 mm in thickness) at intervals of 5 minutes. The yellowness index (YI), sec Table 2, is then determined in accordance with ASTM D 1925-70 (high YI values denote significant discoloration and thus low stability).

TABLE 2

| Experiment duration | 5 | 10 | 15 | 20 | 25 | 30 | 35 | 40 minutes |
|---|---|---|---|---|---|---|---|---|
| YI | 1.6 | 4.4 | 6.1 | 12.6 | 20.5 | 33.1 | 43.2 | 63.1 |

Examples 2–14

A PVC composition is prepared by mixing individual components as shown in the table below (amounts in parts by weight).

Table 3

100 parts by weight of S-PVC, K value 60

0.2 part by weight of montanic acid esters 1 part by weight of glycerol monooleate and the stabilizers A-1 to A-7, B-1 to B-3 and C-1 to C-5, as shown in Table 4.

The compositions are subjected to a long-term roll test and a static heat test in order to test the stabiliser action in PVC. The long-term roll test (LRT) is carried out by plasticating the PVC composition at 190° C. for 5 minutes on mixing rolls and subsequently cutting samples out of the centre of the film (0.3 mm in thickness) after 20 minutes. The yellowness index (YI), sec Table 4, is then determined in accordance with ASTM D 1925-70 (high YI values denote significant discoloration and thus low stability).

The static heat test (SHT) is carried out in a recirculating drying oven at a temperature of 190° C.; the yellowness index (YI), sec Table 4, is determined after 20 minutes.

TABLE 4

| Ex. No. | Stabilizers | LRT | SHT |
|---|---|---|---|
| 2 | 1,1 A-1; 0,2 B-1; 0,5 C-1; | 17,0 | |
| 3 | 1,1 A-1; 0,2 B-2; 0,5 C-1; | 18,9 | |
| 4 | 1,1 A-1; 0,2 B-3; 0,5 C-1; | 22,7 | |
| 5 | 1,2 A-1; 0,2 B-1; 0,5 C-2; | 13,3 | |
| 6 | 1,2 A-1; 0,2 B-1; 0,5 C-3; | 19,3 | |
| 7 | 1,2 A-1; 0,2 B-1; 0,5 C-4; | 21,8 | |
| 8 | 1,2 A-1; 0,2 B-1; 0,5 C-5; | 19,4 | |
| 9 | 1,2 A-2; 0,1 B-1; 0,5 C-1; | 12,7 | |
| 10 | 1,2 A-3; 0,1 B-1; 0,5 C-1; | 16,3 | |
| 11 | 0,9 A-4; 0,1 B-1; 0,8 C-1; | | 26,4 |
| 12 | 0,9 A-5; 0,1 B-1; 0,8 C-1; | | 28,3 |
| 13 | 0,8 A-6; 0,1 B-1; 1,0 C-1; | | 8,9 |
| 14 | 0,8 A-4; 0,1 B-1; 1,0 C-1; | | 14,6 |

The stabilizers used are:
A-1: $[(C_4H_9)_2SnO_2C\text{-}n\text{-}C_7H_{15}]_2O$
A-2: $(C_8H_{17})_2Sn(O_2CCH)_2$ (maleate)
A-3: $(C_4H_9)_2SnO_2CC_6H_4CO_2$ (phthalate)
A-4: $[(C_4H_9)_2SnOC_{13}H_{27}]_2O$
A-5: $[(C_4H_9)_2SnOC_6H_4C_9H_{17}]_2O$
A-6: mixture of $(C_4H_9)Sn(O)OC_{13}H_{27}(62,5\%)$ and $[(C_4H_9)SnOC_{13}H_{27}]_2O(37,5\%)$
A-7: mixture of $(C_4H_9)Sn(O)OC_6H_4C_9H_{17}(62,5\%)$ and $[(C_4H_9)SnOC_6H_4C_9H_{17}]_2O(37,5\%)$
B-1: $Zn(O_2CCH(C_2H_5)C_4H_9)_2$
B-2: $Zn(O_2CC_{11}H_{23})_2$
B-3: $Zn(O_2CC_6H_5)_2$
C-1: $[C_4H_9CH(C_2H_5)CH_2OC(O)CH_2S]_3P=O$
C-2: $(C_4H_9\text{—}O\text{—}C_2H_4OOCCH_2S)_3P$
C-3: $(C_4H_9\text{—}O\text{—}C_2H_4OOCCH_2S)_3P=O$
C-4: $[C_4H_9CH(C_2H_5)CH_2OC(O)CH_2S]_3P=S$
C-5: $[C_4H_9CH(C_2H_5)CH_2OC(O)CH_2S]_3P$

What is claimed is:

1. A composition comprising a chlorine-containing polymer and a stabiliser mixture comprising:

a) at least one tin alcoholam or tin carboxylate of the formula $[(R_2)_2Sn(OR')]_2O$ (Ia);

$[(R_2)Sn(OR')_2]_2O$ (Ib);

$(R_2)Sn(OR')O$ (Ic);

$[-(R_2)Sn(OR')O\text{—}]_{m\ (Id)};$ $[-(R_1CO_2Sn(R_2)_2]_2O$ (IIa); or $[-(R_2)_2Sn\text{—}O_2C\text{—}R_3\text{—}CO_2\text{—}\{(R_2)_2SnO\{(R_2)_2SnO\}_i\text{—}]_n$ (IIb);

where R' is $C_3\text{–}C_{24}$alkyl, phenyl, $C_1\text{–}C_{12}$alkyl-substituted phenyl or phenyl-$C_1\text{–}C_{12}$alkyl;

$R_1$ is $C_3\text{–}C_{24}$alkyl, phenyl, $C_1\text{–}C_{12}$alkyl-substituted phenyl, $C_5\text{–}C_{10}$cycloalkyl, phenyl-$C_1\text{–}C_{12}$alkyl or $R_4\text{—}O_2C\text{—}CH=CH\text{—}$;

$R_2$ is $C_1\text{–}C_{24}$alkyl or $C_4\text{–}C_{18}$alkanoyloxyethyl;

$R_3$ is phenylene, $C_1\text{–}C_{12}$alkyl-substituted phenylene, $C_1\text{–}C_{18}$alkylene or $\text{—}CH=CH\text{—}$ $R_4$ is $C_1\text{–}C_{24}$alkyl, $C_5\text{–}C_{10}$cycloalkyl, phenyl or $C_1\text{–}C_{12}$alkyl-substituted phenyl;

i is a number greater than or equal to zero;

m is the number 2 or 3, and n is a number greater than or equal to one;

b) at least one organic zinc carboxylate, zinc phenoxide or a tin chloride of the formula $[(R_1CO_2)_x(R_2)_yCl_zSn]_aO_{a-1}$ (III)

where $R_1$ and $R_2$ are as defined under formula (I);

x and y, independently of one another, are 0, 1 or 2;

a is the number 1 or 2;

z is the number 1, 2, 3 or 4, with the proviso that x+y+z+a is five;

and c) at least one thiophosphate or thiophosphite of the formula $$(R_6S)_3P=X_b \quad (IV)$$

where $R_6$ is $C_3-C_{18}$alkyl, phenyl, $C_1-C_{12}$alkyl- or $R_5CO_2$-substituted phenyl, $C_4-C_{21}$alkanoyloxyalkylene, $C_1-C_{18}$ alkoxycarbonyl-$C_1-C_{12}$alkylene, which may be interrupted by oxygen, sulfur or $-NR_5-$, phenyl-$C_1-C_2$alkylenoxycarbonyl-$C_1-C_{12}$alkylene, which may be interrupted by oxygen, sulfur or $-NR_5-$, $C_1-C_{12}$alkyl-substituted phenyl-$C_1-C_{12}$ alkylenoxycarbonyl—$C_1-C_{12}$alkylene, which may be interrupted by oxygen, sulfur or $-NR_5-$, or $C_5-C_{15}$cycloalkyl-$C_0-C_6$alkyleneoxycarbonyl-$C_1-C_{12}$alkylene, which may be interrupted by oxygen, sulfur or $-NR_5-$;

$R_5$ is hydrogen or $C_1-C_6$alkyl;

X is oxygen or sulfur, and b is the number zero or 1, with the further proviso that the composition does not include a sodium, calcium, magnesium or aluminum salt of a monoalkyl ester of an unsaturated dicarboxylic acid.

2. A composition according to claim 1, in which component a) is a compound of the formula (IIa) in which $R_1$ is $C_6-C_{18}$alkyl and $R_2$ is $C_4-C_8$alkyl, or of the formula (IIb) in which $R_3$ is phenylene or $-CH=CH-$.

3. A composition according to claim 1, in which component (b) is an organic zinc carboxylate of a carboxylic acid having 7 to 18 carbon atoms or a compound of the formula (III) in which $R_1$ is $C_6-C_{18}$alkyl, $R_2$ is $C_4-C_8$alkyl and a is the number 1.

4. A composition according to claim 1, in which component c) is a compound of the formula (IV) in which $R_6$ is $C_3-C_{18}$alkyl, $R_5CO_2$-substituted phenyl, oxygen-interrupted $C_1-C_{18}$alkyloxycarbonyl-$C_1-C_{12}$alkylene, phenyl-$C_1-C_{12}$alkyleneoxycarbonyl-$C_1-C_{12}$alkylene or $C_5-C_{18}$cycloalkyl-$C_0-C_6$alkyleneoxycarbonyl-$C_1-C_{a2}$alkylene; and $R_5$ is hydrogen or $C_1-C_6$alkyl.

5. A composition according to claim 1, comprising $[C_4H_9CH(C_2H_5)CO_2-Sn-(C_4H_9)_2O$, $[C_{7-9}H_{15-19}CO_2]_2Zn$ and $[C_4H_9CH(C_2H_5)CH_2OC(O)CH_2S]_3P=O$.

6. A composition according to claim 1, comprising, based on 100 parts by weight of composition, a) from 0.1 to 2.5 parts by weight of a compound of the formula (Ia), (Ib), (Ic), (Id), (IIa) or (IIb), b) from 0.01 to 2 parts by weight of a zinc carboxylate, zinc phenoxide or a compound of the formula (III) and c) from 0.1 to 3 parts by weight of a compound of the formula (IV).

7. A composition according to claim 1, comprising, based on 100 parts by weight of composition, a) from 0.5 to 1.5 parts by weight of a compound of the formula (Ia), (Ib), (Ic), (Id), (IIa) or (IIb), b) from 0.05 to 1 part by weight of a zinc carboxylate, zinc phenoxide or a compound of the formula (III) and c) from 0.3 to 2 parts by weight of a compound of the formula (IV).

8. A composition according to claim 1, in which the polymer is or contains polyvinyl chloride.

9. A method of producing rigid profiles for external application or of rigid sheeting comprising using a composition of claim 1.

* * * * *